(12) United States Patent
Kanehara et al.

(10) Patent No.: US 7,846,049 B2
(45) Date of Patent: Dec. 7, 2010

(54) BELT FOR CONTINUOUSLY VARIABLE TRANSMISSION

(75) Inventors: Shigeru Kanehara, Saitama (JP); Toru Yagasaki, Saitama (JP); Motonori Ohnuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 659 days.

(21) Appl. No.: 11/245,065

(22) Filed: Oct. 7, 2005

(65) Prior Publication Data

US 2006/0079366 A1   Apr. 13, 2006

(30) Foreign Application Priority Data

Oct. 8, 2004 (JP) ............... P2004-296530

(51) Int. Cl.
*F16G 1/00* (2006.01)
*F16G 5/16* (2006.01)

(52) U.S. Cl. .................... 474/201; 474/242

(58) Field of Classification Search ............ 474/201, 474/242
See application file for complete search history.

(56) References Cited

U.S. PATENT DOCUMENTS

| | | | |
|---|---|---|---|
| 4,299,586 A * | 11/1981 | Van der Hardt Aberson | 474/201 |
| 4,457,742 A * | 7/1984 | Hattori et al. ............... | 474/201 |
| 4,595,385 A * | 6/1986 | Henderson .................. | 474/201 |
| 4,610,648 A | 9/1986 | Miranti, Jr. | |
| 5,019,020 A * | 5/1991 | van Lith ..................... | 474/240 |
| 5,123,880 A * | 6/1992 | Sekine et al. ............... | 474/244 |
| 6,238,313 B1 * | 5/2001 | Smeets et al. .............. | 474/244 |
| 6,565,469 B1 * | 5/2003 | Aoyama et al. ............ | 474/242 |
| 6,578,249 B2 * | 6/2003 | Fujioka ....................... | 29/434 |
| 6,626,782 B1 * | 9/2003 | Ohsono et al. ............. | 474/242 |
| 2002/0160872 A1 * | 10/2002 | Kanokogi et al. .......... | 474/242 |

FOREIGN PATENT DOCUMENTS

| | | |
|---|---|---|
| CN | 1105838 C | 4/2003 |
| EP | 1 267 091 A2 | 12/2002 |
| JP | 5-37067 Y2 | 9/1993 |
| JP | 11-351336 A | 12/1999 |
| JP | 2002-048195 A | 2/2002 |

* cited by examiner

*Primary Examiner*—Robert A Siconolfi
*Assistant Examiner*—Stephen Bowes
(74) *Attorney, Agent, or Firm*—Arent Fox LLP (57) ABSTRACT

A belt (metal V belt) has a number of elements held by a ring in an endless shape and aligned in a peripheral direction of the ring. The element includes a head portion, a neck portion and a body portion. The body portion has a V face brought into contact with a drive pulley and a driven pulley and left and right locking edge portions wrapped with the ring and disposed on an inner peripheral side of the ring. The head portion is disposed on an outer peripheral side of the ring and having an ear portion extended to left and to right sides to be opposed to the locking edge portion. The neck portion integrally connects the body portion and the head portion. Front faces of the ear portion, the neck portion and the locking edge portion of the element are formed with contact portions capable of bringing the contiguous elements into contact with each other.

6 Claims, 10 Drawing Sheets

BELT FOR CONTINUOUSLY VARIABLE TRANSMISSION

BACKGROUND OF THE INVENTION

1. Technical Field

The present invention relates to a belt for a continuously variable transmission used in, for example, a belt type continuously variable transmission of an automobile.

2. Related Art

Figure 10:
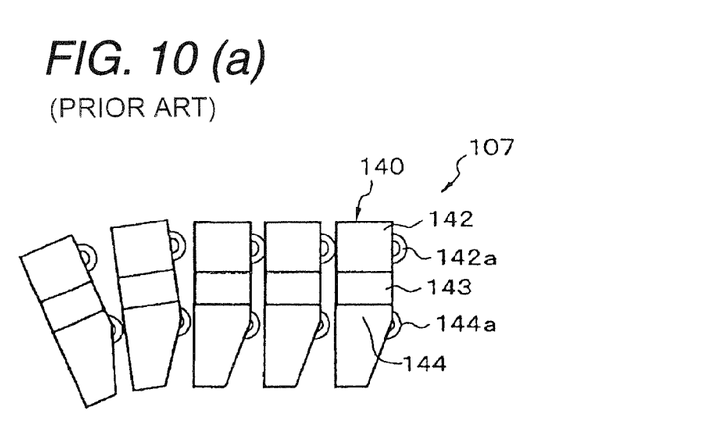

A belt used in a belt type continuously variable transmission is constituted by holding a number of elements by a ring in an endless shape. For example, as shown by FIG. 10 (a), an element 140 comprises an ear portion 142, a neck portion 143 and a body portion 144. Thick-walled portions 142a, 144a are formed at the ear portion 142 and the body portion 144, respectively. The vibration of belt is prevented by contacting the thick-walled portions 142a, 144a with the element 140 disposed on a front side thereof (refer to, for example, JP-UM-B-5-37067).

However, in the belt 107 with the above-described structure, the contact of the element 140 with the element 140 disposed on the front side thereof is restricted by the thick-walled portions 142a, 144a formed at the ear portion 142 and the body portion 144. Therefore, as shown by FIG. 10 (b), a rigidity of a pushing side chord portion N of the belt 107 in a belt advancing direction cannot be sufficiently ensured and the vibration of belt is generated. Further, at a high belt peripheral speed, the pitching of element 140 is produced at an outlet of a drive pulley by advancing an outer side of the element 140 faster. When the thick-walled portions 142a, 144a are formed at the ear portion 142 and the body portion 144, it is impossible to prevent the vibration of belt which is caused by the pitching of element 140 produced at the high belt peripheral speed. Further, also at a wrapping portion of the belt 107, when the element 140 is urged such that its V face becomes orthogonal to the pulley, in the case in which a plate thickness difference is produced within a locking edge portion 145 of the body portion 144, the locking edge portion 145 cannot stably be brought into contact with a rear face of the element 140 on the front side and there is a possibility of accelerating wear of the V face.

Figure 8A:
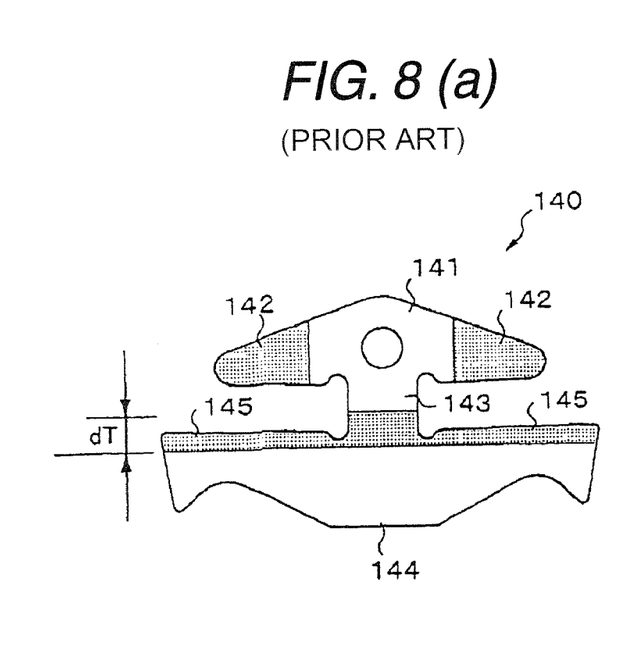

Further, as shown in FIG. 8(a), since there is no contact point at the neck portion, the effective radius dT for bending moment can not be made to the sufficient value. Therefore, the pitching of the body portion is prevented mainly by bending moment of the neck portion with one portion in the center of the body portion and the locking edge portion as a center, and thus, it is difficult to prevent completely the pitching of the body portion.

SUMMARY OF THE INVENTION

The invention has been carried out in view of such a problem and it is an object thereof to provide a belt for a continuously variable transmission sufficiently ensuring a rigidity at a pushing side chord portion in a belt advancing direction by restraining the pitching of a metal element.

In order to resolve the above-described problem, a belt for a continuously variable transmission according to the invention (for example, a metal V belt 7 according to an embodiment) comprises a metal ring in an endless shape (for example, a ring 50 according to the embodiment), and a number of metal elements (for example, elements 40 according to the embodiment) held by the metal ring and aligned in a peripheral direction of the metal ring, wherein the metal element includes left and right locking edge portions including a V face brought into contact with a drive pulley and a driven pulley and being wrapped with the metal ring, a body portion disposed on an inner peripheral side of the metal ring, a head portion disposed on an outer peripheral side of the metal ring and having an ear portion extended to left and right sides to be opposed to the locking edge portion, and a neck portion integrally connecting the body portion and the head portion, and wherein front faces of the ear portion, the neck portion and the locking edge portion of the metal element are formed with contact portions capable of bringing the contiguous metal elements into contact with each other.

In such a belt for a continuously variable transmission, it is preferable that plate thicknesses of the contact portion of the ear portion and the contact portion of the neck portion are formed by sizes substantially the same as each other, and a plate thickness of the contact portion of the locking edge portion is formed to be thinner than the plate thicknesses of the contact portions of the ear portion and the neck portion.

Further, it is preferable that an upper end of the contact portion formed at the neck portion is disposed on an upper side of a lower end of the contact portion formed at the ear portion.

When the belt for a continuously variable transmission according to the invention is constituted as described above, by the contact portions formed at the ear portion, the neck portion and the locking edge portion, a rigidity of the belt for a continuously variable transmission at a pushing side chord portion can sufficiently be endured. Further, even when the metal element is urged to be orthogonal to the pulley at the wrapping portion, by stably bringing the locking edge portions into contact with each other, uneven wear at the V face of the metal element can firmly be prevented.

Further, the plate thicknesses of the contact portions of the ear portion and the neck portion are made by substantially the same size and the plate thickness of the contact portion of the locking edge portion is made to be thinner than the plate thicknesses of the contact portions of the ear portion and the neck portion. Thus, pitching of the metal element generated at an outlet of the drive pulley particularly at high belt peripheral speed can be prevented and vibration of the belt for a continuously variable transmission can be prevented.

Further, the upper end of the contact portion formed at the neck portion is disposed on the upper side of the lower end of the contact portion formed at the ear portion. Thus, the metal element is prevented from being rotated in a pitching direction by constituting a pivot point by the contact portion of the ear portion. Further, by effectively preventing a bending stress of the neck portion by the rotation, the rigidity of the belt for a continuously variable transmission at the pushing side chord portion can be increased.

Figure 8B:
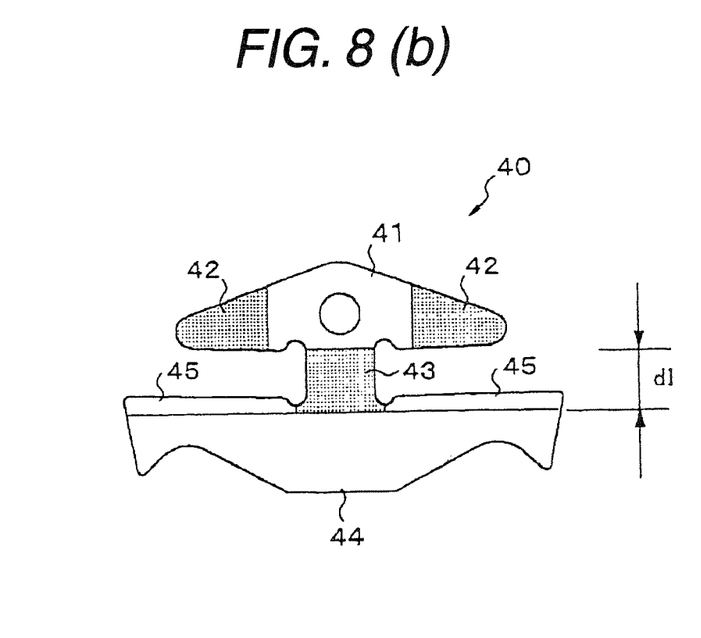

Further, as shown in FIG. 8(b), there is the contact portion at one portion of the neck portion, and thus, the effective radius dl for the bending moment can be made to the sufficiently large value. Therefore, the pitching of the body portion can be prevented and the vibration of the element line of the pushing side chord portion can be prevented effectively.

BRIEF DESCRIPTION OF THE DRAWINGS

FIG. 5 (a) illustrates a sectional view taken along a line V-V of FIG. 4 in a case of forming a stepped portion at a boundary of a neck portion and a saddle face on a rear face side.

FIG. 5 (b) illustrates a sectional view taken along a line V-V of FIG. 4 in a case of forming a stepped portion at the boundary of the neck portion and the saddle face on a front face side.

FIG. 5(c) illustrates a sectional view taken along a line V-V of FIG. 4 in a case of forming the neck portion and a locking edge portion on the front face side such that plate thicknesses thereof are thinned in a taper shape.

FIG. 7 (a) illustrates a view enlarging an essential portion showing operation of the metal V belt according to the invention.

FIG. 7 (b) illustrates a view showing operation of the metal V belt according to the invention and showing states of a wrapping portion and a pushing side chord portion.

FIG. 8 (a) illustrates a plane view showing a structure of an element of a related art.

FIG. 8 (b) illustrates a plain view showing a structure of the element according to the invention.

FIG. 10 (a) illustrates a view enlarging an essential portion showing operation of a metal V belt of the related art.

FIG. 10 (b) illustrates a view showing operation of a metal V belt of the related art and showing states of a wrapping portion and a pushing side chord portion.

DETAILED DESCRIPTION OF THE INVENTION

Figure 1:
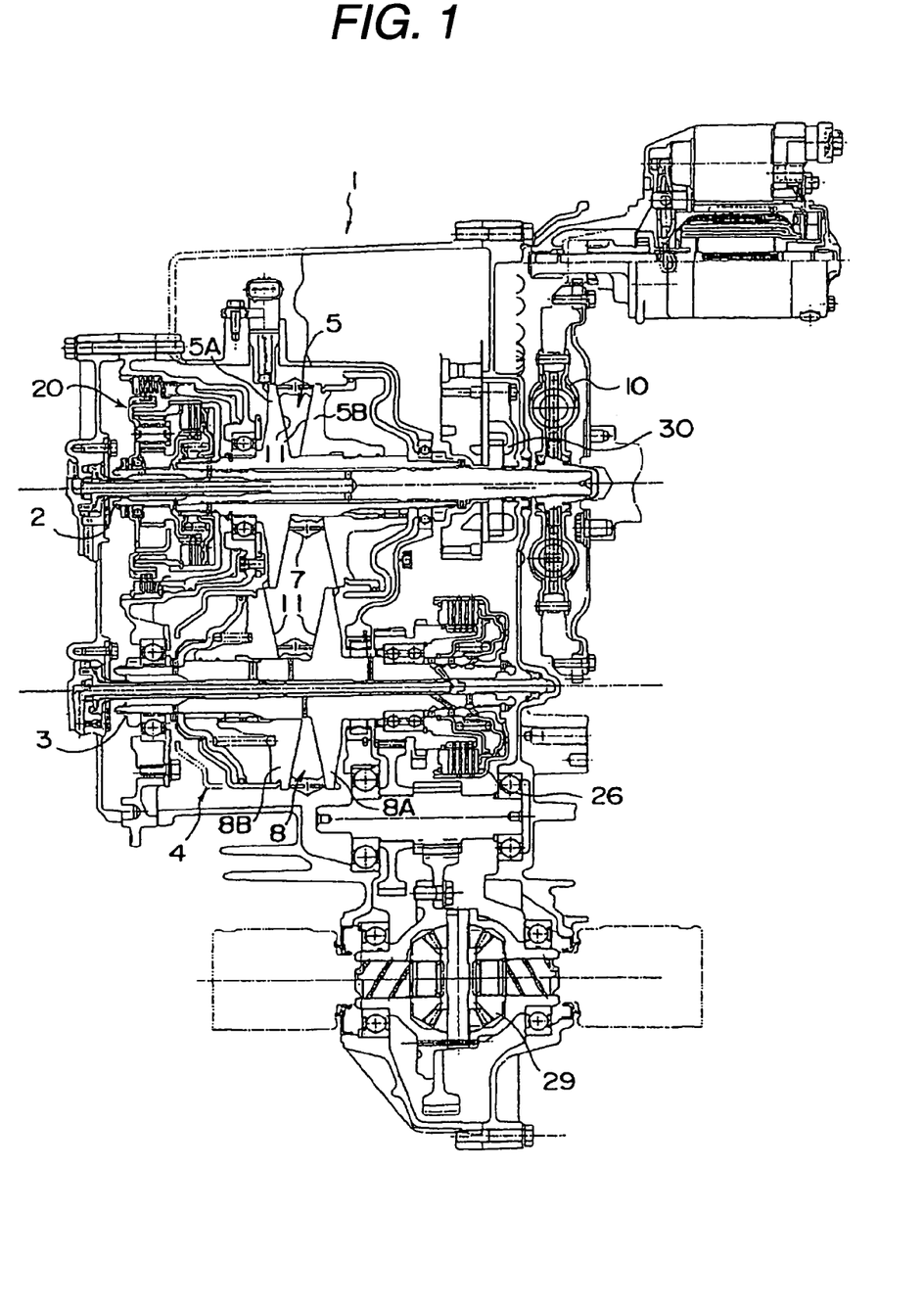
FIG. 1 is a sectional view showing a total constitution of a belt type continuously variable transmission.
Figure 2:
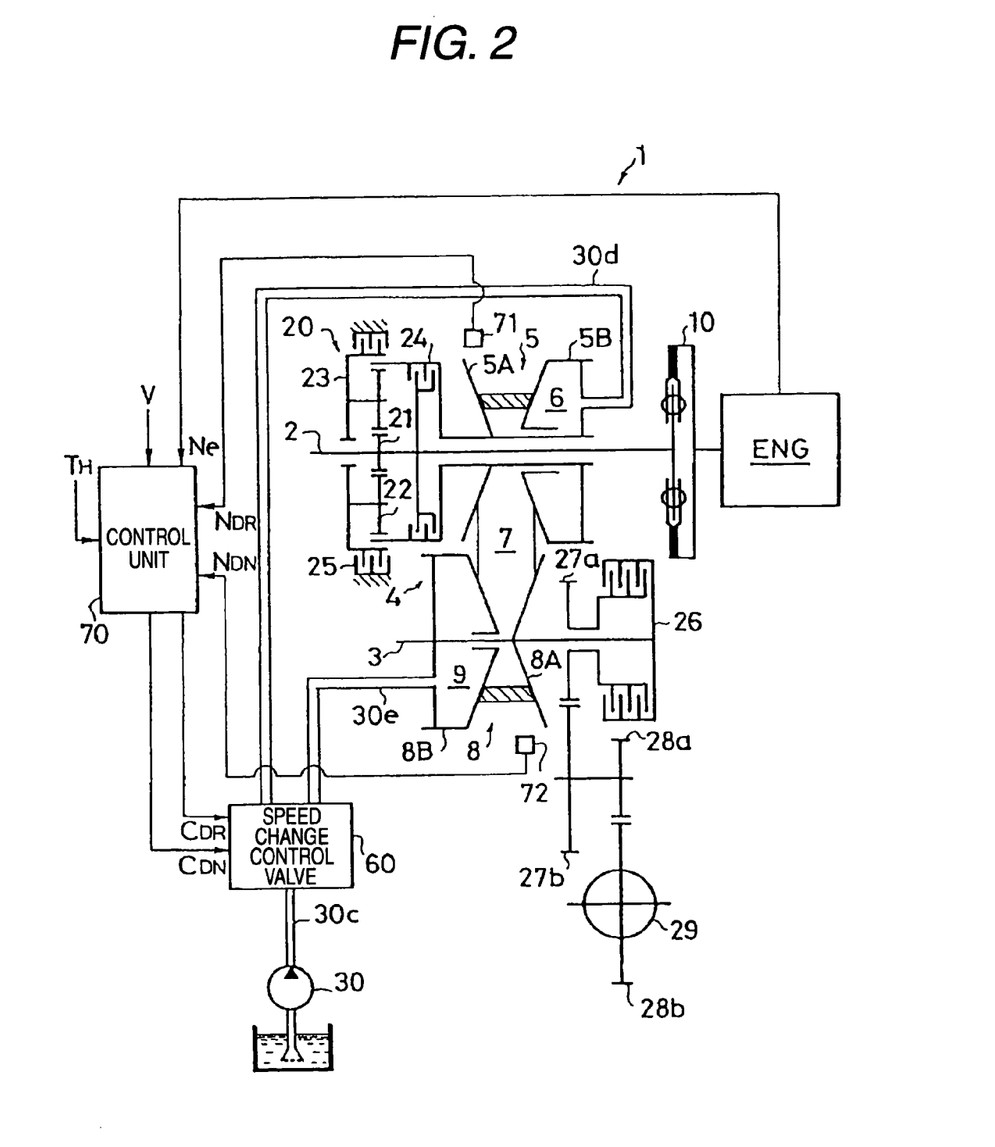
FIG. 2 is a skeleton view showing the total constitution of the belt type continuously variable transmission.

A preferable embodiment of the invention will be explained as follows in reference to the drawings. FIG. 1 and FIG. 2 show a total constitution of a belt type continuously variable transmission 1 using a belt for a continuously variable transmission (hereinafter, refer to as metal V belt 7') according to the embodiment. The belt type continuously variable transmission (CVT) 1 comprises a transmission input shaft 2, a transmission counter shaft 3, a metal V belt mechanism 4, and a planetary gear type forward/rearward switching mechanism 20. The transmission input shaft 2 is connected to an output shaft of an engine ENG via a flywheel damper 10. The transmission counter shaft 3 is arranged in parallel with the transmission input shaft 2. The metal V belt mechanism 4 is arranged between the two shafts 2, 3. The planetary gear type forward/rearward switching mechanism 20 is arranged on the transmission input shaft 2. The belt type continuously variable transmission 1 is provided with a hydraulic pump 30, a speed change control valve 60 and the like. A working oil from the hydraulic pump 30 is fed to the speed change control valve 60 via an oil path 30c. Then, the working oil is fed to the metal V belt mechanism 4 via oil paths 30d and 30e by the being controlled by the speed change control valve 60 to execute a speed change control.

The metal V belt mechanism 4 comprises a drive pulley 5, a driven pulley 8, and the metal V belt 7. The drive pulley 5 is rotatably arranged on the transmission input shaft 2. The driven pulley 8 is arranged on the transmission counter shaft 3 to rotate integrally with the transmission counter shaft 3. The metal V belt 7 is wrapped to hang between the two pulleys 5, 8.

Figure 3:
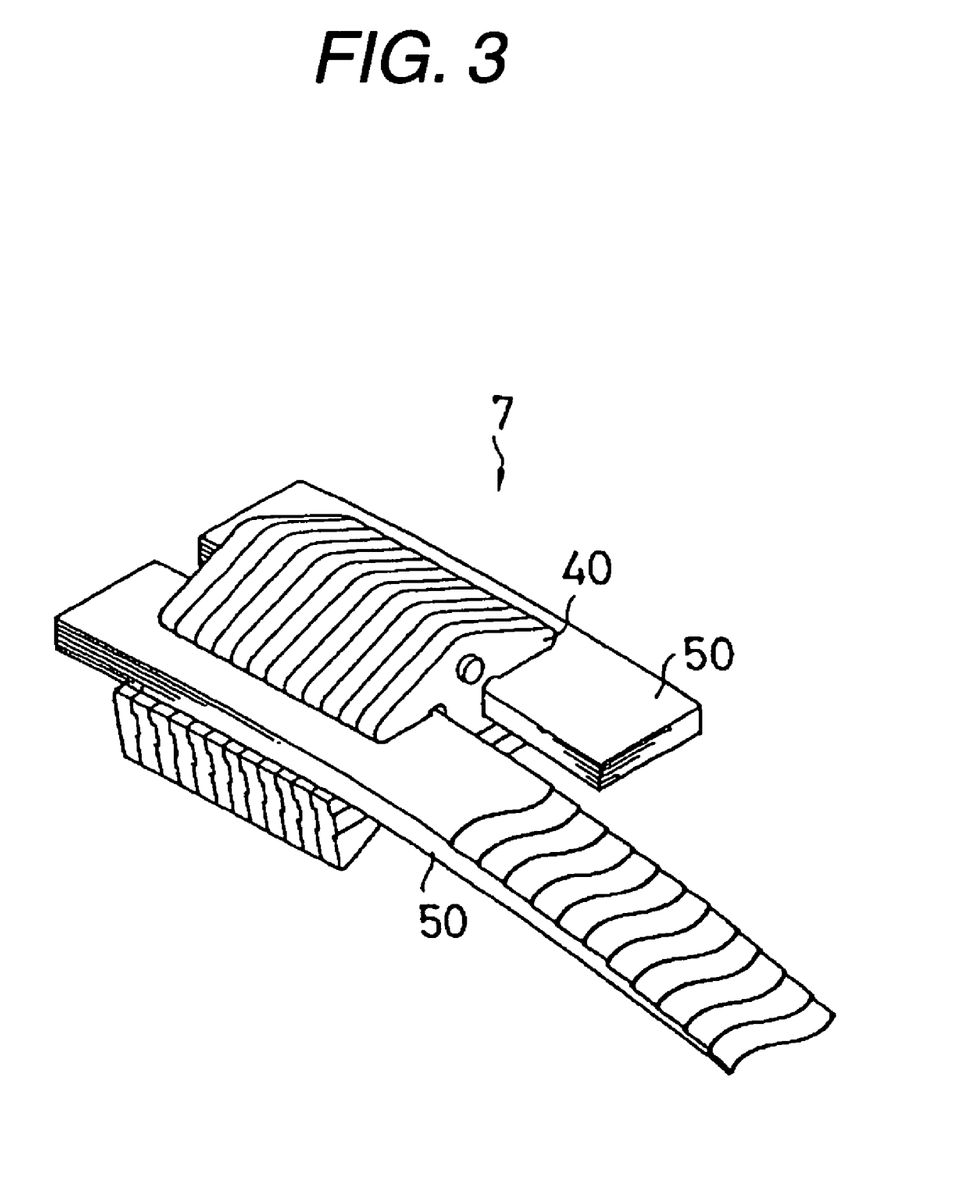
FIG. 3 is a perspective view showing a structure of a metal V belt.
Figure 4:
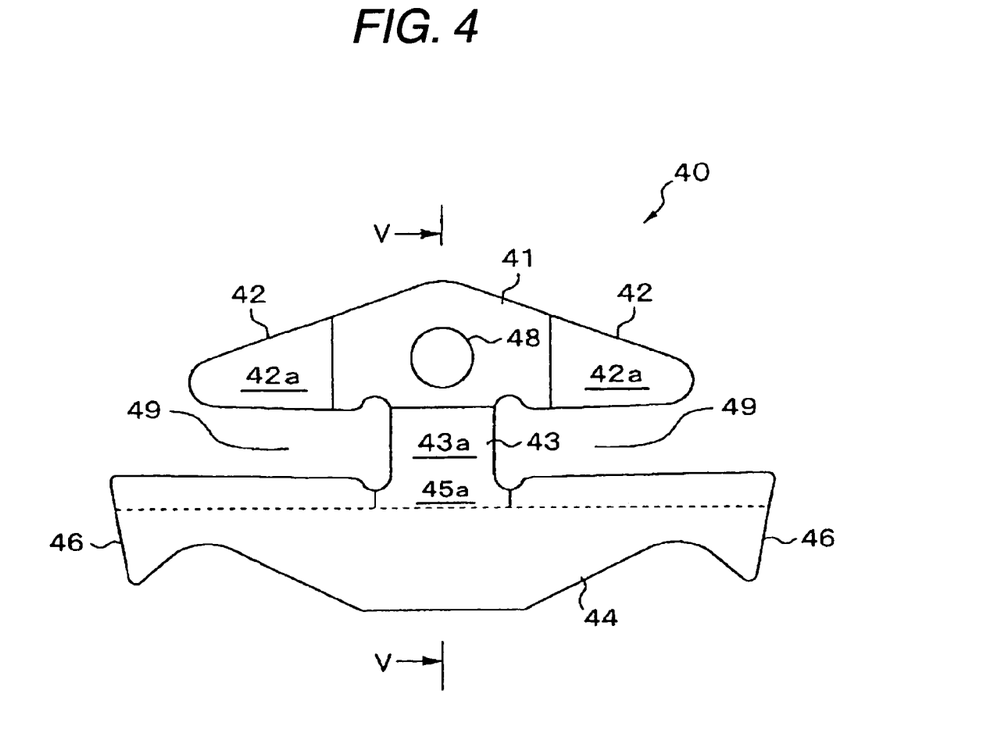
FIG. 4 is a rear view of an element constituting the metal V belt according to the invention.
Figure 5:
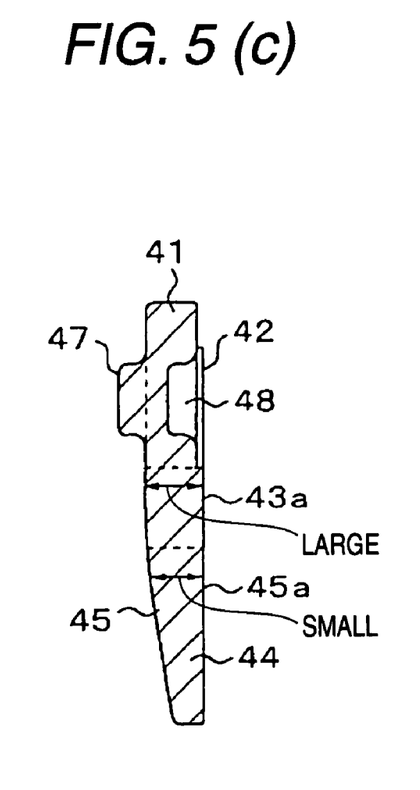

As shown by FIG. 3, the metal V belt 7 comprises a number of connected elements 40 and two bundles of rings 50 to which the elements 40 are attached to being aligned in a peripheral direction of rings 50. As shown by FIG. 4 and FIG. 5, the element 40 is formed in a flat plate shape and comprises a head portion 41, a neck portion 43 and a body portion 44.

The head portion 41 is extended with ear portions 42 on the left and on the right. The body portion 44 is extended in a left and right direction. The neck portion 43 connects the head portion 41 and the body portion 44 in an up and down direction. A front face (a face in an advancing direction of the metal V belt 7 pushed out from the drive pulley 5) of the head portion 41 is projected to form with a nose portion 47. A rear face of the head portion 41 is formed with a nose hole 48 in a recess shape. Therefore, the elements 40 are connected by fitting the nose portion 47 at the nose hole 48. The rings 50 are pinched by ring slots 49 formed between the ear portions 42 formed on the left and on the right of the element 40 and an upper face (saddle face) of a locking edge portion 45 constituting an upper portion of the body portion 44. V faces 46 are formed on both left and right side faces of the body portion 44, and the V faces 46 are brought into contact to be pinched by V faces 11 of the drive and the pulleys 5, 8, mentioned later.

The drive pulley 5 comprises a fixed pulley half member 5A rotatably arranged on the transmission input shaft 2 and a movable pulley half member 5B movable relative to the fixed pulley half member 5A in an axial direction. A drive side cylinder chamber 6 is formed on a side of the movable pulley half member 5B. By a hydraulic pressure supplied from the speed change control valve 60 via the oil path 30d, a thrust in an axial direction (thrust in the axial direction of the drive pulley) for moving the movable pulley half member 5B in the axial direction is generated. A portion of the fixed pulley half member 5A brought into contact with the metal V belt 7 is formed with the V face 11, and the V face 11 is formed also at a face of the movable pulley half member 5B opposed to the fixed pulley half member 5A. Further, the metal V belt 7 is pinched by the V faces 11 formed at the fixed pulley half member 5A and the movable pulley half member 5B.

The driven pulley 8 comprises a fixed pulley half member 8A and a movable pulley half member 8B movable relative to the fixed pulley half member 8A in an axial direction. A driven side cylinder chamber 9 is formed at a side of the movable pulley half member 8B. By a hydraulic pressure supplied from the speed change control valve 60 via the oil path 30e, a thrust in an axial direction (thrust in the axial direction of the driven pulley) for moving the movable pulley half member 8B in the axial direction is generated. The driven pulley 8 is also formed with the V faces 11 similar to those of the drive pulley 5 and the metal V belt 7 is pinched between the V faces 11 of the fixed pulley half member 8A and the movable pulley half member 8B.

In this way, by controlling the hydraulic pressure (pulley side pressure controlling hydraulic pressure) supplied to the drive side cylinder chamber 6 and the driven side cylinder chamber 9, a pulley shaft thrust which does not produce slip at the metal V belt 7 (referred to as slip preventing shaft thrust) can be set. Further, pulley widths of the drive pulley 5 and the driven pulley 8 can variably be set, and a gear ratio can be controlled steplessly (continuous) by continuously changing radii of wrapping the metal V belt 7 to the two pulleys 5, 8.

The planetary gear type forward/rearward switching mechanism 20 is provided with a single pinion type planetary gear mechanism. The planetary gear type forward/rearward switching mechanism 20 comprises a sun gear 21 coupled to the transmission input shaft 2, a carrier 22 coupled to the fixed pulley half member 5A, a ring gear 23 capable of being fixedly held by a rearward moving brake 25, and a forward moving clutch 24 capable of connecting the sun gear 21 and the ring gear 23. When the forward moving-clutch 24 is engaged, the sub gear 21, the carrier 22 and the ring gear 23 are integrally rotated with the transmission input shaft 2 and the drive pulley 5 is driven to rotate in a direction the same as that of the transmission input shaft 2 (forward moving direction). On the other hand, when the rearward moving brake 25 is engaged, the ring gear 23 is fixedly held and the carrier 22 is driven to rotate in a direction reverse to that of the sun gear 21 (rearward moving direction).

Power from the engine ENG transmitted to the transmission counter shaft 3 by changing speed thereof via the metal V belt mechanism 4, the planetary gear type forward/rearward switching mechanism 20 constituted as described above is transmitted to a differential mechanism 29 via a start clutch 26 and gears 27a, 27b, 28a, and 28b and is dividedly transmitted to left and right wheels, not illustrated.

Further, as described above, a speed change control is carried out by controlling to supply the hydraulic pressure to the drive side and the driven side cylinder chambers 6, 9 by the speed change control valve 60. The speed change control valve 60 is controlled to be operated by speed change control signals CDR, CDN from a control unit 70. The speed change control valve 60 comprises two pieces of solenoid valves for controlling the hydraulic pressures supplied to the drive side cylinder chamber 6 and the driven side cylinder chamber 9. The hydraulic pressures in the two cylinder chambers 6, 9 are set based on the speed change control signals CDR, CDN outputted from the speed change control unit 70 and the solenoid valves, and thus, the thrusts in the axial direction of the drive and the driven pulleys operated to the drive and driven pulleys 5,8 are set. For the speed change control, an engine revolution signal Ne, an engine throttle opening degree signal TH, a vehicle speed signal V, a drive pulley rotational signal NDR provided from a drive side rotational signal detector 71 and a driven pulley rotational signal NDN provided from a driven side rotational number detector 72 are detected and inputted to the speed change control unit 70.

In the metal V belt mechanism 4 of the belt type continuously variable transmission 1 constituted as describe above, the elements 40 constituting the metal V belt 7 are brought into contact with each other to transmit a torque from the drive pulley 5 to the driven pulley 8. Therefore, there is a concern of generating vibration at the metal V belt 7 by contact of the elements 40 or pitching, or generating uneven wear at the contact faces (V faces 46) between the drive and the driven pulleys 5, 8 and the metal V belt 7 or twist at the metal V belt 7. Hence, as shown by FIG. 4 and FIG. 5, the element 40 of the embodiment is constituted by making plate thicknesses of a front end portion of the ear portion 42 and center portions of the neck portion 43 and the locking edge portion 45 thicker than that of other portion to form contact portions 42a, 43a, 45a. With contact portions 42a, 43a, 45a, the contiguous elements 40 are brought into contact with each other and thus, vibration or the like of the metal V belt 7 can be prevented.

Further, thicknesses of the contact portions 42a, 43a of the ear portion 42 and the neck portion 43 are formed to be substantially the same size. A thickness of the contact portion 45a of the locking edge portion 45 is formed to be thinner than the thicknesses of the contact portions 42a, 43a. Therefore, as shown by FIG. 5 (a), on the rear face side the element 40, a boundary portion of the neck portion 43 and the saddle face may be formed in a step-like shape. Or, as shown by FIG. 5 (b), on the front face side of the element 40, a boundary portion of the neck portion 43 and the saddle face may be formed in a step-like shape. Or as shown by FIG. 5 (c) on the front face side of the element 40, the plate thickness may be formed to be thinned in a taper shape from a lower portion of the neck portion 43 to the locking edge portion 45.

Figure 6:
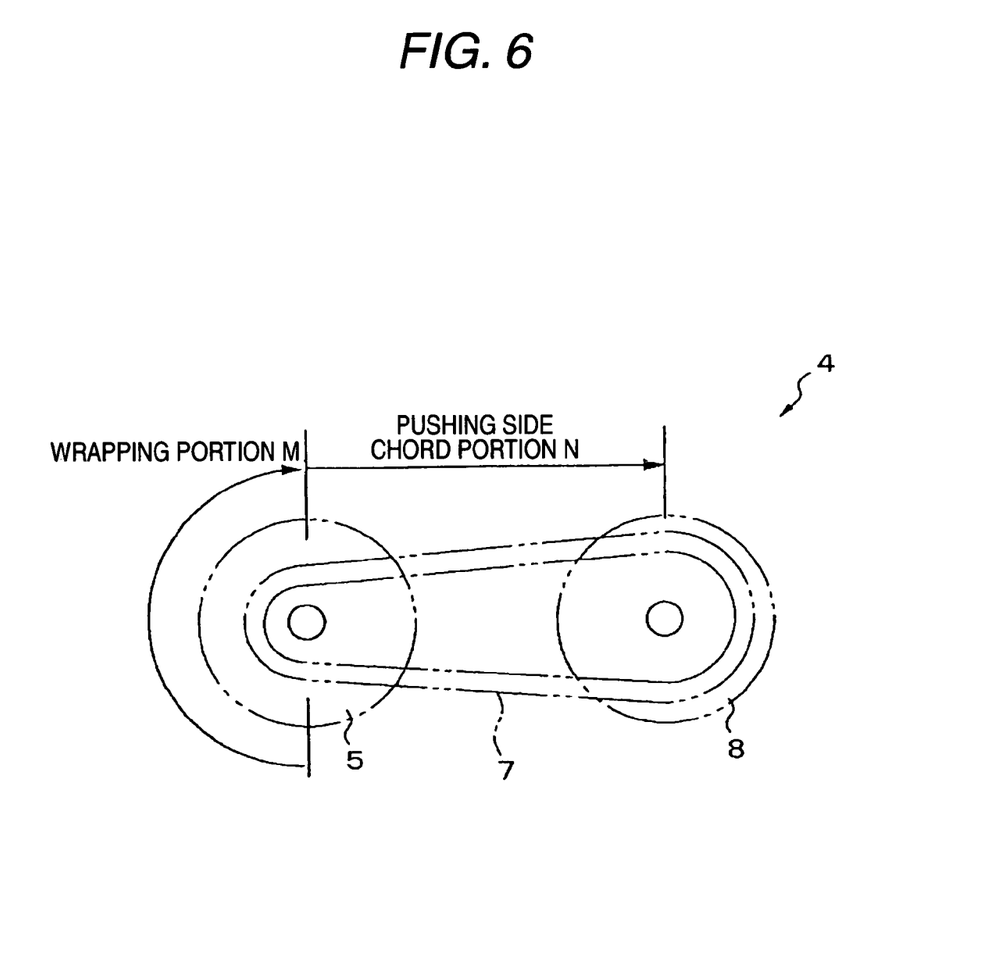
FIG. 6 is a view showing a metal V belt mechanism.

Now, an explanation will be given of operation of the metal V belt 7 constituted in this way in reference to FIG. 7. Further, as shown by FIG. 6, a portion of the metal V belt 7 wrapped to hang on the drive pulley 5 is referred to as a wrapping portion M and a portion thereof pushed out from the drive pulley 5 is referred to as a pushing side chord portion N. Further, in FIG. 7, the contact portions 42a, 43a, 45a are expressed in a shape of a half ring to facilitate explanation.

Figure 7:
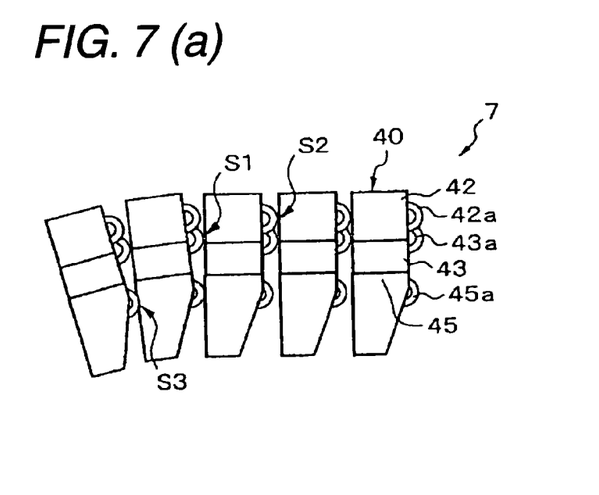

First, as shown by FIG. 7, since the metal V belt 7 is bent along the drive pulley 5, the contact portion 45a of the locking edge portion 45 is brought into contact with the rear face of the element 40 disposed on a front side thereof (S3 in FIG. 7 (a)). Therefore, even when the elements 40 are urged to be orthogonal to the drive pulley 5 (or the driven pulley 8), the locking edge portions 45 of the elements 40 are brought into contact with each other to be stably supported thereby and vibration is not generated. Therefore, uneven wear of the V face 46 can firmly be prevented.

Further, when the metal V belt 7 is pushed out from the wrapping portion M to the pushing side chord portion N, first, the contact portion 43a of the neck portion 43 is brought into contact with the rear face of the element 40 on the front side thereof (S1 in FIG. 7 (a)), next, the contact portion 42a of the ear portion 42 is brought into contact with the rear face of the element 40 on the front side to enter the pushing side chord portion N (S2 in FIG. 7 (a)). Therefore, when the element 40 is pushed out from the wrapping portion M to the pushing side chord portion N, an impact when the element 40 on the rear side is brought into contact with the element 40 on the front side is dispersed to alleviate by two times of the contact portions 43a, 42a of the neck portion 43 and the ear portion 42. Therefore, vibration of the metal V belt 7 by the impact by bringing the elements 40 into contact with each other is not induced.

Further, when a force of pushing out the metal V belt 7 from the drive pulley 5 is large, in the pushing side chord portion, also the thick-walled portion 45a of the locking edge portion 45 is brought in to contact with the rear face of the element 40 on the front side and stability of the metal V belt 7 can be increased.

Figure 9:
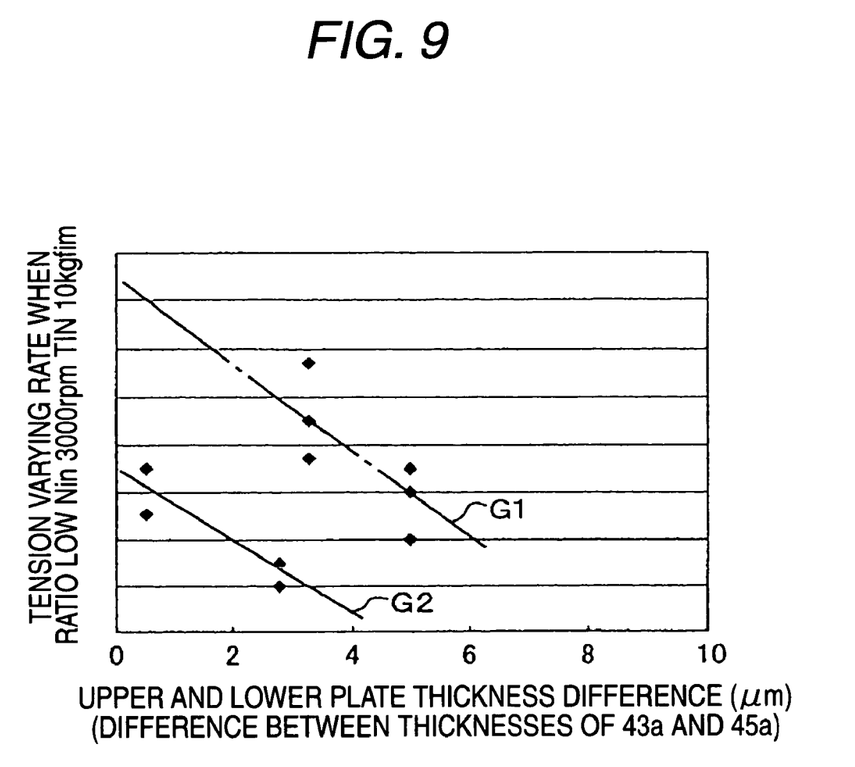
FIG. 9 is a graph showing a rate of varying a tension of the metal V belt.

According to the embodiment, as shown by FIG. 4, in comparison with the element 140 of the related art, the contact portion 43a is formed at the neck portion 43 and therefore, a width of vibration of the metal V belt 7 can be reduced. For example, FIG. 9 is a graph showing a rate of varying a tension (when ratio: LOW, Nin: 3000 rpm, Tin: 10 Kgf·m) at the chord portion N of the metal V belt 7 having such an element 40, or 140 for a difference (referred to as upper and lower plate thickness difference in FIG. 9) between a plate thickness of the contact portions 42a, 43a of the ear portion 42 and the neck portion 43 and a plate thickness of the contact portion 45a of the locking edge portion 45. As shown by FIG. 9, when the upper and lower plate thickness difference is 3 μm, the tension varying rate according to the embodiment (G2 in FIG. 9) can be made to be ⅓ of the tension varying rate of the metal V belt 107 when the element 140 of the related art is used (G1 in FIG. 9).

The reason of capable of restraining an amount of varying the tension at the chord portion N of the metal V belt 7 to ⅓ of that of the related art is that as shown by FIG. 7, at an outlet of the drive pulley 5 (a boundary of the wrapping portion M and the pushing side chord portion N), pitching of the element 40 which comes to the pushing side chord portion N to shift to a linear movement while falling forward to pitch can be restrained by bringing one portion of the contact portion 43a of the neck portion 43 into contact with the rear face of the element 40 prior to the contact portion 42a of the ear portion 42. Particularly, when the metal V belt 7 is at high belt peripheral speed, vibration caused by pitching by proceeding an outer side of the element 40 faster at the output of the drive pulley 5 can be prevented.

Further, as shown by FIG. 4, in the case of the element 40 according to the embodiment, an upper end of the contact portion 43a of the neck portion 43 is formed to dispose on an upper side of a lower end of the contact portion 42a of the ear portion 42. Therefore, a gap between the neck portions 43 of the elements 40 contiguous each other is nullified and therefore, a rigidity of the neck portion 43 is further increased and a vibration preventing effect is increased.

Further, a center portion of the body portion 44 and the contact portion 43a of the neck portion 43 may be continuous, and all of the effects of the embodiment can be achieved.

The principle effects achieved by the embodiment of the invention explained above will be summarized as follows.

First, the elements 40 are brought into contact with each other at the contact portions 42a at two left and right symmetrical portions formed at the ear portion 42, the contact portion 43a formed at the neck portion 43 and the contact portion 45a formed at the center portion of the locking edge portion 45 of the body portion 44. Therefore, pitching centering on the locking edge portion 45 at the pushing side chord portion N of the metal V belt 7 can effectively be prevented by the contact portion 43a of the neck portion 43. Thus, the rigidity of the metal V belt 7 in a belt advancing direction at the pushing side chord portion N can sufficiently be endured. Further, also at the wrapping portion M, even when the element 40 is urged to be orthogonal to the pulley 5, 8, the locking edge portions 45 can stably be brought into contact with each other by the contact portions 45a and therefore, uneven wear of the V face 46 of the element 40 can firmly be prevented.

Second, with regard to portions formed with the contact portions 42a, 43a, 45a, the plate thicknesses of the ear portion 42 and the neck portion 43 are made to be substantially the same and the plate thickness of the locking edge portion 45 is made to be thinner than the plate thicknesses of the ear portion 42 and the neck portion 43. Therefore, at the outlet of the drive pulley 5, the element 40 which comes out from the wrapping portion M to the pushing side chord portion N and is going to be shifted to the linear movement while falling forward to pitch is brought into contact with the rear face of the element 40 on the front side by one portion of the contact portion 43a formed at the neck portion 43 prior to the contact portion 42a formed at the ear portion 42. Thus, in addition to the first effect, the pitching of elements 40 can be prevented and vibration caused by the pitching generated at the outlet of the drive pulley 5 at high belt peripheral speed can be prevented.

Third, since the upper end of the contact portion 43a formed at the neck portion 43 is disposed on the upper side of the lower end portion 42a formed at the ear portion 42 and therefore, the rigidity at the pushing side chord portion N of the metal V belt 7 can be increased.

We claim:

1. A belt for a continuously variable transmission comprising:
a metal ring in an endless shape; and
a number of metal elements held by the metal ring and aligned in a peripheral direction of the metal ring, each of the metal elements having left and right locking edge portions including a V face brought into contact with a drive pulley and a driven pulley and being wrapped with the metal ring, a body portion disposed on an inner peripheral side of the metal ring, a head portion disposed on an outer peripheral side of the metal ring and including an ear portion extended to left and right sides to be opposed to the locking edge portion, and a neck portion integrally connecting the body portion and the head portion,
wherein front faces of the ear portion, the neck portion and the locking edge portion of the metal element are formed with contact portions having a plate thickness greater than a thickness of the head portion, wherein an upper end of the contact portion formed at the neck portion is disposed above a saddle face of the locking edge portion and extends to the head portion, and wherein a boundary portion of the neck portion on one of a rear face and a front face of the metal element has a step shape.

2. The belt for a continuously variable transmission according to claim 1, wherein the plate thicknesses of the contact portion of the ear portion and the contact portion of the neck portion are formed to be substantially the same as each other, and the plate thickness of the contact portion of the locking edge portion is formed to be thinner than the plate thicknesses of the contact portions of ear portion and the neck portion.

3. The belt for a continuously variable transmission according to claim 2, wherein an upper end of the contact portion formed at the neck portion is disposed on an upper side of a lower end of the contact portion formed at the ear portion.

4. The belt for a continuously variable transmission according to claim 1, wherein a plate thickness of the contact portion at a front end portion of the ear portion, a plate thickness of the contact portion at a center portion of the neck portion, and a plate thickness of the contact portion at a center portion of the locking edge portion are thicker than the thickness of the other portions of the metal element.

5. The belt for a continuously variable transmission according to claim 1, wherein the plate thickness of the neck portion tapers from a lower portion of the neck portion to the locking edge portion.

6. The belt for a continuously variable transmission according to claim 1, wherein the boundary portion is located between the contact portion of the neck portion and the contact portion of the locking edge portion on one of the rear face and the front face of the metal element.

* * * * *